J. A. SUNDQUIST.
FRUIT PICKER.
APPLICATION FILED MAY 7, 1914.
1,120,423.
Patented Dec. 8, 1914.
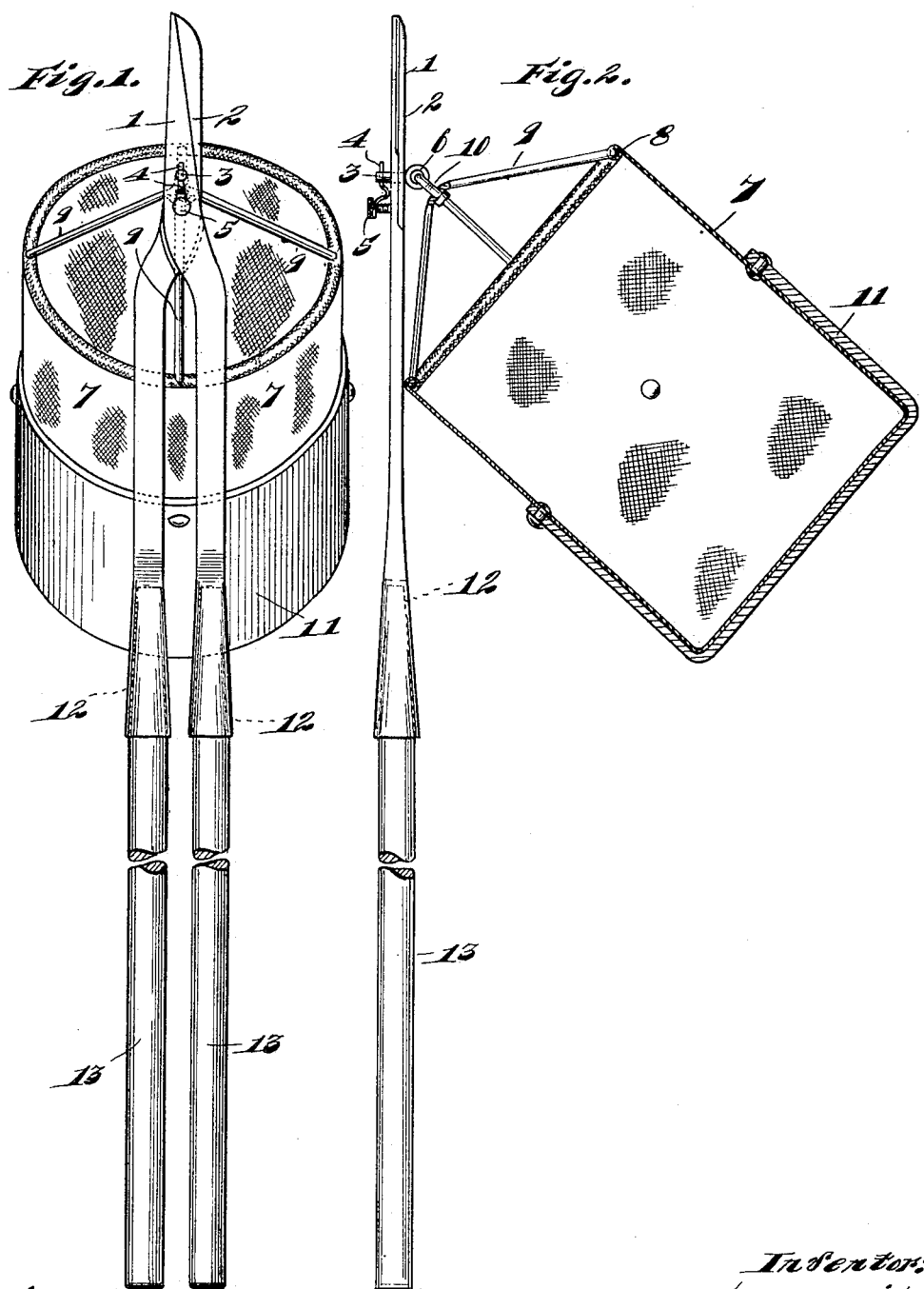
Witnesses:
C. E. Wessels
A. A. Olsen
Inventor:
John A. Sundquist,
By Joshua R. H. Potts
his Attorney.

UNITED STATES PATENT OFFICE.

JOHN A. SUNDQUIST, OF GEORGETOWN, CONNECTICUT.

FRUIT-PICKER.

1,120,423.      Specification of Letters Patent.      Patented Dec. 8, 1914.

Application filed May 7, 1914. Serial No. 836,945.

*To all whom it may concern:*

Be it known that I, JOHN A. SUNDQUIST, a citizen of Finland, Russia, and a resident of Georgetown, in the town of Wilton, county of Fairfield, and State of Connecticut, have invented certain new and useful Improvements in Fruit-Pickers, of which the following is a specification.

My invention relates to improvements in fruit pickers and has for its object the production of a device of this character which will be of simple construction and efficient in use.

Other objects will appear hereinafter.

The invention consists in the combinations and arrangements of parts hereinafter described and claimed.

The invention will be best understood by reference to the accompanying drawing forming a part of this specification, and in which, Figure 1 is a front elevation of a fruit picker embodying my invention, the central portions of the handles of the device being broken away, and Fig. 2 is a side elevation of Fig. 1 with the fruit receptacle shown in section.

The preferred form of construction as illustrated in the drawing comprises a pair of scissors consisting of two blades 1 and 2 which are pivotally connected by a pivot pin 3. Said pin 3 is releasably secured in position by means of a spring 4 which engages a transversely extending slot provided in one end of said pin, said spring being curved intermediate its ends for engagement against the adjacent side of the blade 1 and the opposite end of said spring engaging under the head of a screw 5, which is threaded in said blade 1. The arrangement is such, as will be observed, that the spring 4 serves the double function of securing the pin 3 in position and of normally holding the blades 1 and 2 in operative relation, it being clear that the resiliency of said spring coöperates with said blades in performing the latter function. The construction is such that by threading the screw 5 into the blade 1, the tension of said spring may be increased so as to adapt the same to exert a greater force upon the blades, said spring being thus adapted to take up wear upon said blades. It is of course understood that said spring will be strong enough to overcome the tendency of the receptacle, even when the latter is filled with fruit, to move the pin 3 downwardly so as to loosen the scissor blades and preclude the possibility of the same cutting the fruit when the device is in operation.

Formed at the opposite end of the pin 3 is an eye 6. Arranged below said pivot pin is a cylindrical receptacle 7 formed preferably of fabric and open at its upper end. A metallic ring 8 is provided at the mouth or upper edge of said receptacle to reinforce the same and also serves to normally hold the mouth of the receptacle open. Connected with said ring is a web 9, said web being connected at its central or outer end with the eye 6 by means of a swivel 10. The arrangement is such, as will be observed, that said receptacle is supported directly under the cutting portions of the blades 1 and 2 so that any fruit which may be severed by said blades, when the device is in use, will drop into said receptacle and be retained thereby.

By reason of the loose swivel connection between the receptacle and the cutting element of the device, it will be seen that said receptacle is adapted to adjust itself to position below the outer ends of the cutting blades in order to be adapted to receive the fruit severed by said blades no matter at what angle said blades may be held. The base portion of the receptacle 7 is preferably inclosed in a reinforcing and strengthening covering 11 of leather which may be secured to the body of said receptacle by rivets, as shown.

The rearward ends of the blades 1 and 2 are provided with tapering sockets 12 for the reception of corresponding ends of elongated handles 13, said ends of said handles being tapered to fit snugly in said sockets. With this arrangement handles of appropriate length for use in connection with fruit trees of various heights may be attached to the blades 1 and 2 in the employment of the picker. The lower ends of the handles, in using the picker are operated by the one engaged in the picking, the fruit which is severed by the upper ends of the blades 1 and 2 dropping into the receptacle 7, the latter during the picking operation, being lowered at intervals to empty the fruit therefrom.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A fruit picker comprising a pair of scissors consisting of two blades and an eye pin pivotally connecting said blades, an adjustable spring engaging with said pin to lock the latter in operative position and to normally hold said blades in operative relation with each other; a receptacle loosely suspended from the eye of said pin; and elongated handles for operating said blades, substantially as described.

2. A fruit picker comprising a pair of scissors consisting of two blades and a pin pivotally connecting said blades; an adjustable spring engaging said pin to lock the latter in operative position and to normally hold said blades in operative relation with each other; a screw for adjusting the tension of said spring; and a receptacle loosely suspended from said scissors, substantially as described.

In testimony whereof I have signed my name to this specification in the presence of two subscribing witnesses.

JOHN A. SUNDQUIST.

Witnesses:
ROBERT S. ALEXANDER,
RENA B. ENGELAGE.

Copies of this patent may be obtained for five cents each, by addressing the "Commissioner of Patents, Washington, D. C."